United States Patent [19]
Romi

[11] Patent Number: 5,971,675
[45] Date of Patent: Oct. 26, 1999

[54] BORING DEVICE

[75] Inventor: José Carlos Romi, Sta. Bárbara d'Oeste-SP, Brazil

[73] Assignee: Industrias Romi, S.A., Santa Barbara d'Oeste, Brazil

[21] Appl. No.: 08/910,158

[22] Filed: Aug. 12, 1997

[51] Int. Cl.⁶ .................................................. B23B 51/00
[52] U.S. Cl. ........................... 408/171; 74/441; 408/161; 408/168
[58] Field of Search .................................... 408/153, 158, 408/161, 168, 169, 171; 74/441

[56] References Cited

U.S. PATENT DOCUMENTS

| | | |
|---|---|---|
| 2,178,384 | 10/1939 | Young . |
| 3,159,060 | 12/1964 | Miles . |
| 3,364,799 | 1/1968 | Benjamin et al. . |
| 3,477,319 | 11/1969 | Koppelmann . |
| 3,542,528 | 11/1970 | Bech .......................................... 29/103 |
| 4,047,829 | 9/1977 | Benjamin et al. ...................... 408/171 |
| 5,222,846 | 6/1993 | Romi ...................................... 408/161 |
| 5,316,417 | 5/1994 | Romi ...................................... 408/153 |
| 5,326,198 | 7/1994 | Romi ...................................... 408/161 |
| 5,622,373 | 4/1997 | Tagami ..................................... 279/52 |

FOREIGN PATENT DOCUMENTS

| | | |
|---|---|---|
| 0593223 | 4/1994 | European Pat. Off. . |
| 1477252 | 6/1969 | Germany . |
| 2250459 | 6/1992 | United Kingdom . |

OTHER PUBLICATIONS

Nicholas P. Chironis, Ed., Mechanisms, Linkages, and Mechanical Controls (New York: McGraw–Hill), p. 188, 1965.

*Primary Examiner*—Steven C. Bishop
*Attorney, Agent, or Firm*—Steinberg & Raskin, P.C.

[57] ABSTRACT

A boring device for finishing high precision bores including a cylindrical body and a tool supporting member movable in a direction perpendicular to the longitudinal axis of the cylindrical body and adapted to retain a boring tool or implement. Movement of the tool supporting member is caused upon rotation of a rotatable ring which is mounted for rotation about the longitudinal axis of the cylindrical body, such rotation of the ring acting to move a crossbeam along the longitudinal axis. The crossbeam is fixed to, and similarly moves, an elongate rod and an oblique extension thereof. The oblique extension is slidably engaged at least partially within the tool supporting member. The crossbeam extends substantially perpendicular to the longitudinal axis of the cylindrical body and has at its ends threads in engagement with an internal thread of the rotatable ring. Axial movement of the crossbeam is enabled by its receipt within an axially extending slot of the cylindrical body.

25 Claims, 3 Drawing Sheets

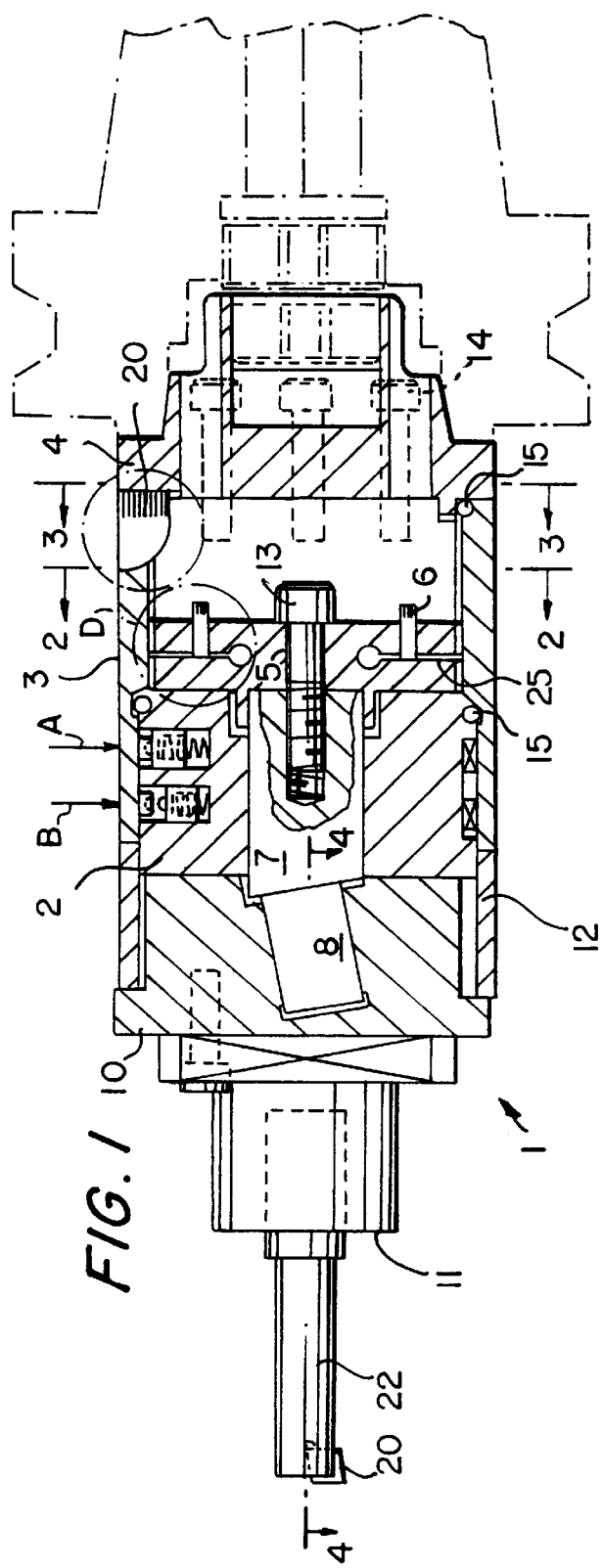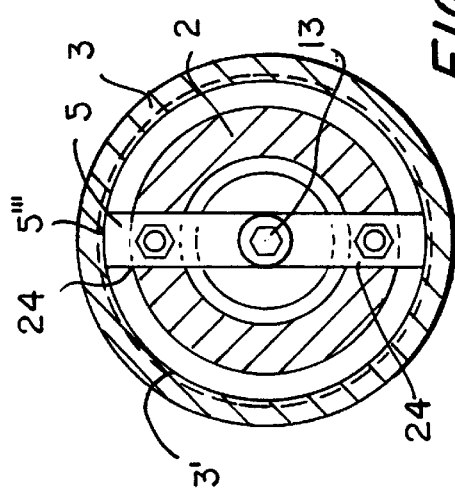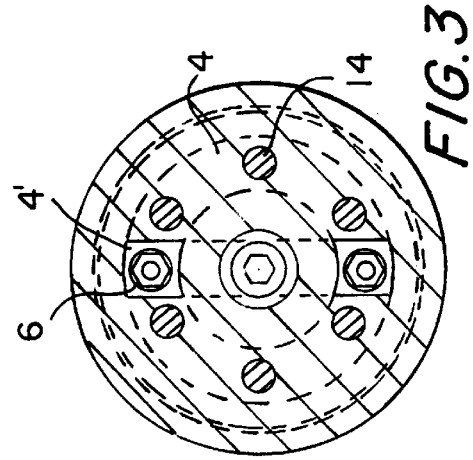

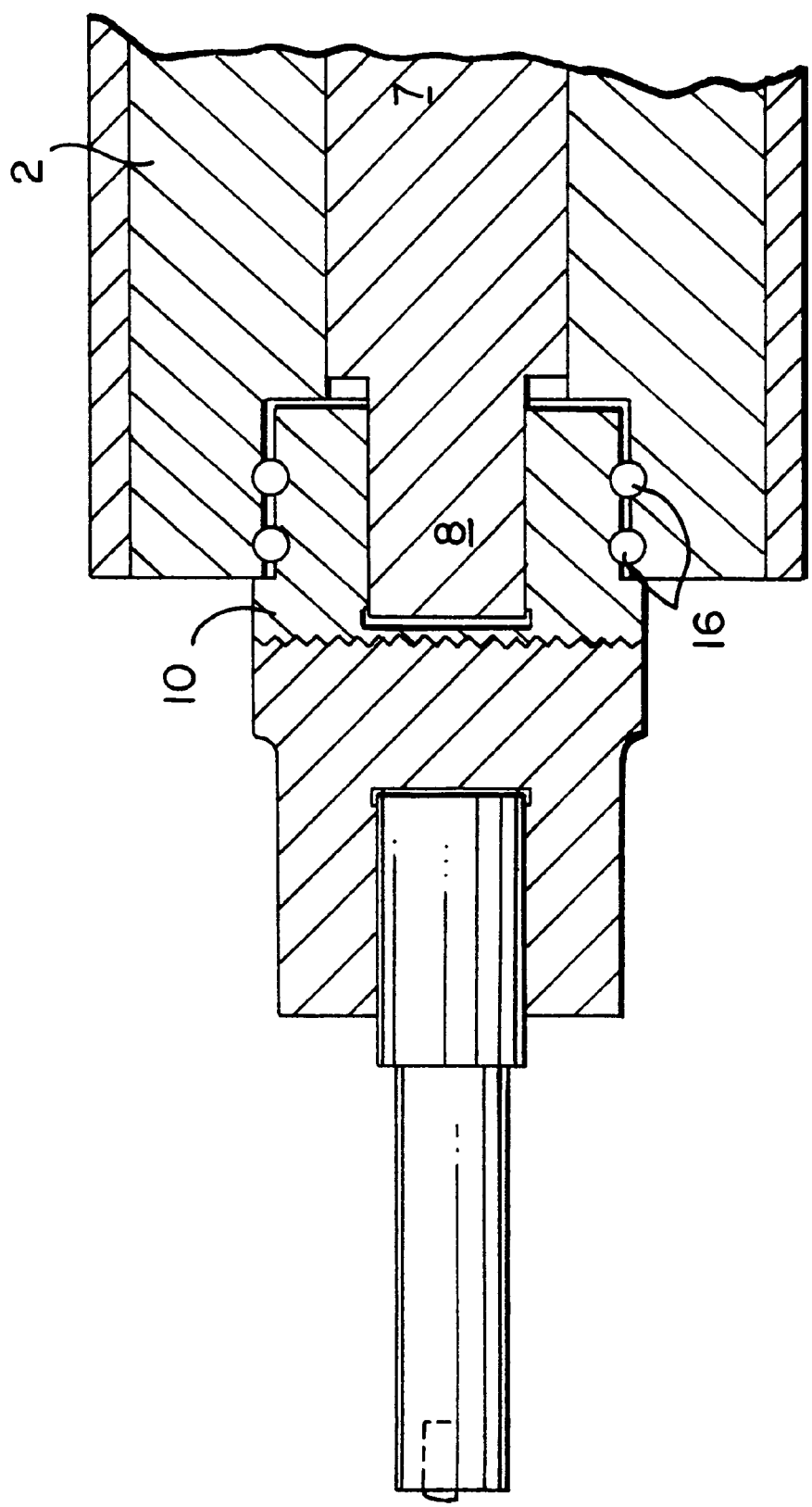

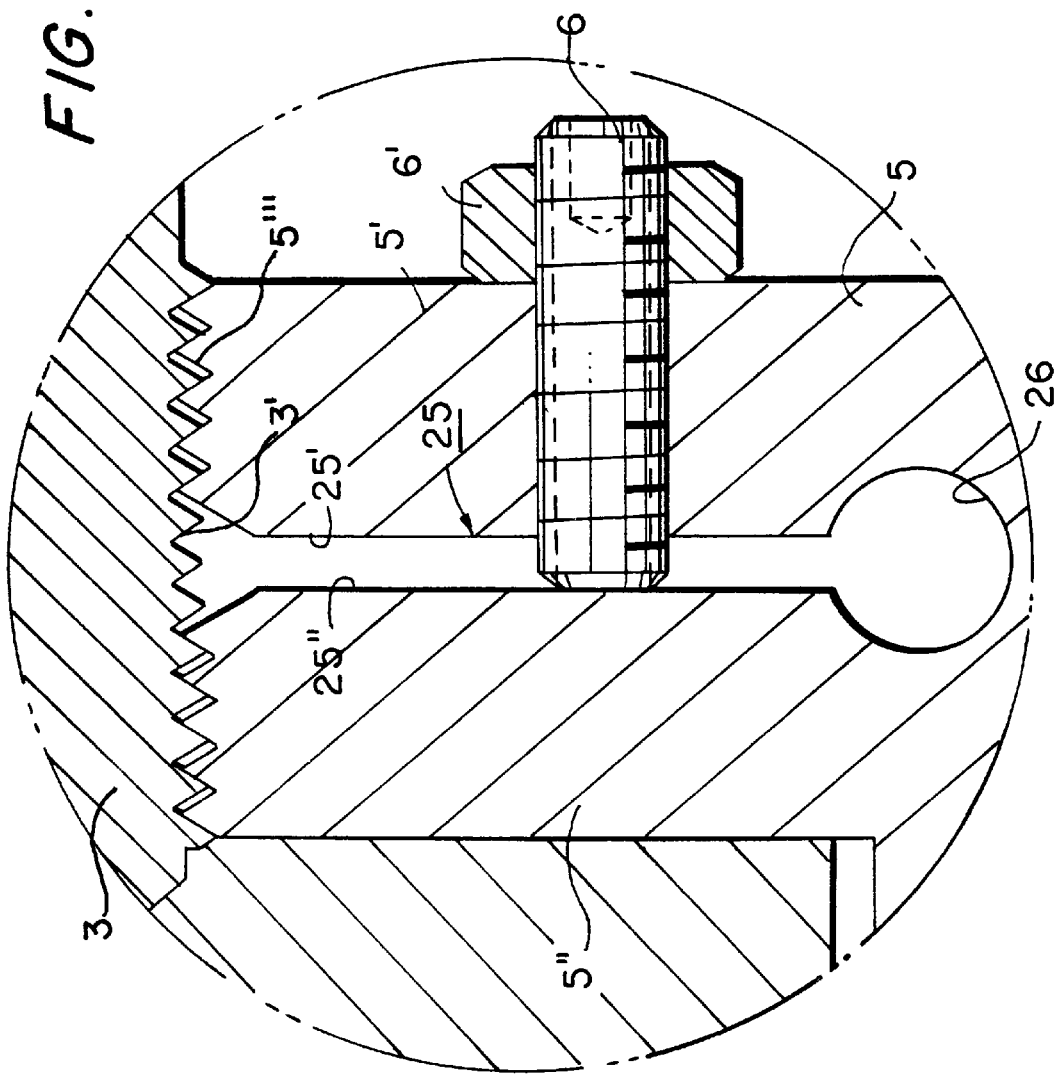

BORING DEVICE

FIELD OF THE INVENTION

The present invention relates to a boring device for, e.g., finishing high precision bores.

BACKGROUND OF THE INVENTION

Great Britain Patent No. 2,250,459 describes a micrometric device for finishing bores having a rotatable micrometric screw extending longitudinally in a substantially cylindrical, hollow body, a tool supporting member with a tool holder movable with respect to the cylindrical body, and means for causing linear movement of the tool supporting member upon rotation of the micrometric screw. This micrometric device is not particularly compact.

German Patent Publication No. 14 77 252 describes a micrometric device for finishing bores in which the moving means for causing linear movement of the tool comprise a substantially cylindrical elongate rod arranged to be moved linearly upon rotation of a micrometric screw, and having an oblique portion extending at an angle to the longitudinal axis of the rod. The oblique portion is slidably engaged in a tool supporting member such that rotation of the micrometric screw causes displacement of the tool supporting member in a direction substantially perpendicular to the rotational axis of the micrometric screw.

European Patent No. 0 593 223 describes a micrometric device for finishing bores which also has an oblique portion slidably engaged in a tool supporting member so that rotation of a micrometric screw causes displacement of the tool supporting member. In the device of EP '223, rotation of the micrometric screw is translated into linear movement of the elongate rod by means of upper and lower bushings within the cylindrical rod. Backlash suppression means are also provided to suppress backlash between the oblique portion and a crossbeam.

OBJECTS AND SUMMARY OF THE INVENTION

It is an object of the present invention to provide a boring device which has a novel structure for the moving means, and a novel backlash suppression system.

It is another object of the invention to provide a new and improved boring device for finishing bores.

According to a first aspect of the present invention, a boring device for finishing high precision bores comprises a substantially cylindrical body, a tool supporting member supported by and movable with respect to the cylindrical body, a rotatable ring mounted on the body for rotation about a longitudinal axis of the cylindrical body, and moving means for causing linear movement of the tool supporting member upon rotation of the rotatable ring. The tool supporting member supports, e.g., a tool which is used for finishing bores. The moving means comprise a crossbeam extending in a direction substantially perpendicular to the longitudinal axis of the cylindrical body and which is received within an axially extending slot in an interior of the cylindrical body. The crossbeam is coupled to an elongate rod slidably engaging with the tool supporting member, and is also threadingly engaged with the rotatable ring such that rotation of the ring causes linear movement of the crossbeam within the axially extending slot. The movement of the crossbeam results in movement of the elongate rod and thus movement of the tool supporting member and the tool supported thereby.

It has been found that a boring device of an embodiment of the invention incorporating the displacement or moving means described above is able to provide a substantially accurate radial displacement of the tool supporting member.

A boring device in accordance with the invention has the advantage that the displacement of moving means for causing linear movement of the tool supporting means does not include a micrometric screw. In certain embodiments described below, linear movement may be considered movement in a direction parallel to the longitudinal axis of the cylindrical body and/or in a direction parallel to the longitudinal direction of the elongate rod.

In one particular embodiment, the crossbeam is elongate and has a respective thread provided at each of its ends, i.e., on an outer surface of the crossbeam at each end, which directly engage an internal thread of the rotatable ring, i.e., an inner surface of the ring.

In a preferred embodiment, the elongate rod is fixed to the crossbeam by appropriate fastening means such as screws, and the elongate rod comprises a first part extending substantially along the longitudinal axis of the cylindrical body, and a second oblique part extending at an angle to the longitudinal axis. In one related embodiment, the oblique part of the elongate rod is engaged with the tool supporting member, and in particular extends into a recess in the tool supporting member, and the tool supporting member is mounted on the cylindrical body for movement in a direction substantially perpendicular to the longitudinal axis of the cylindrical body.

Preferably, the boring device further comprises a backlash suppression system for suppressing backlash between the crossbeam and the rotatable ring. The backlash suppression system may comprise at least one backlash suppression screw arranged to suppress play between engaged threads of the crossbeam and the rotatable ring.

In accordance with another facet of the present invention, a boring device for finishing high precision bores comprises a substantially cylindrical body, a tool supporting member supported by and movable with respect to the cylindrical body, a rotatable ring mounted on the body for rotation about a longitudinal axis of the cylindrical body, and displacement or moving means for causing movement of the tool supporting member upon rotation of the rotatable ring. The moving means comprises a crossbeam threadingly engaged with the rotatable ring. The device may also include backlash suppression means for suppressing backlash between the crossbeam and the rotatable ring, e.g., at least one backlash suppression screw arranged to suppress play between engaged threads of the crossbeam and the rotatable ring.

According to a further aspect of the present invention, there is provided a backlash suppression system for cooperating first and second threads of a general apparatus with cooperating threads, wherein the first thread is carried on a first body and the second thread is carried on a second body. For this general apparatus, the backlash suppression system comprises an elongate slot extending in the first body and opening into the first thread. The slot is defined between facing slot surfaces, and at least one backlash suppression screw extends in the first body to engage one of the facing surfaces of the elongate slot to urge the facing surfaces apart.

The distinctive backlash suppression means incorporated within the aspects of the invention as defined above provides precision to the boring device which is comparable to that of a micrometer in a boring device with a micrometric screw. In practice, this means that a user may utilize a boring device, and achieve the standard operations thereof, without necessarily using a micrometer to check the finished bore when the tolerance is one micron (0.001 millimeter) or less.

The present invention, as described in any of the aspects set out above, may include a backlash suppression system which may comprise an elongate slot, defined between facing slot surfaces, extending in the crossbeam and opening into a thread of the crossbeam engaged with a thread of the rotatable ring, and wherein the backlash suppression screw extends in the crossbeam to engage one of the facing slot surfaces to urge the facing surfaces apart.

Preferably, the crossbeam is elongate has a respective thread at each of its ends, and as such, a respective elongate slot and a corresponding backlash suppression screw are associated with each thread of the crossbeam.

In one specific embodiment, a connecting flange is fixed to the cylindrical body, and aligned bores in the connecting flange and cylindrical body enable access to each backlash suppression screw. Each backlash suppression screw may extend in a direction substantially perpendicular with respect to the respective elongate slot. In certain embodiments, each elongate slot extends substantially radially of the crossbeam.

The rotatable ring may be mounted on the cylindrical body by means of bearing balls, i.e., the bearing balls being interposed between the cylindrical body and the ring. In some embodiments, a connecting flange is connected to the cylindrical body, and bearing balls are arranged at the spaced axial ends of the rotatable ring. In this embodiment, the bearing balls at one axial end of the rotatable ring are mounted in direct engagement with the cylindrical body, and the bearing balls at the other axial end of the rotatable ring are mounted in direct engagement with the connecting flange. Preferably, the rotatable ring is arranged coaxial with respect to the longitudinal axis of the cylindrical body. The rotatable ring may be manually rotatable. To this end, the rotatable ring should be externally graduated, i.e., includes graduations on its external surface.

BRIEF DESCRIPTION OF THE DRAWINGS

Embodiments of the present invention will hereinafter be described, by way of example, with reference to the accompanying drawings, in which:

FIG. 1 shows a longitudinal cross-sectional view through a boring device of an embodiment of the invention for finishing high precision bores;

FIG. 2 is a cross-sectional view taken along the line 2—2 in FIG. 1;

FIG. 3 is a cross-sectional view taken along the line 3—3 in FIG. 1;

FIG. 4 is a longitudinal section view showing the mounting of a tool supporting member taken along the line 4—4 in FIG. 1; and FIG. 5 is an enlarged detail D of FIG. 1 showing the backlash suppression means.

DETAILED DESCRIPTION OF THE PREFERRED EMBODIMENTS

Referring to the accompanying drawings wherein like reference numerals refer to the same or similar elements, FIG. 1 shows a micrometric boring device 1 which may be used for finishing both through and blind bores. The boring device 1 includes a cutting tool 20 retained by a tool holder 22. Tool holder 22 is received within a tool shank 11 which is supported on a movable tool support or supporting member 10 situated at a front portion of the boring device 1. The boring device 1 includes a substantially cylindrical body 2 and a movement transmission mechanism which comprises a rotatable ring 3 mounted to be rotatable relative to the cylindrical body 2. A substantially cylindrical housing 12 surrounds the cylindrical body 2. As described below, rotation of the ring 3 causes movement of the tool support 10 in a direction perpendicular to the longitudinal axis of the cylindrical body 2 whereby radial displacement of the cutting tool 20 is thus achieved.

In the boring device 1 as illustrated, the rotatable ring of the movement transmission mechanism is manually rotatable and externally graduated. The ring 3 is arranged to be coaxial with respect to the cylindrical body 2 and is mounted for rotation thereon by bearing balls 15 arranged at each of its axial ends. At the rear axial end of the ring 3, the bearing balls 15 co-operate with a connecting flange 4 which is fixed to the cylindrical body by suitable fastening members such as screws 14. In this respect, the screws 14 engage in a slotted, rearwardly extending part of the cylindrical body 2. It will be appreciated that the bearing balls 15 ensure easy and effective rotation of the ring 3 relative to the body 2. Furthermore, as the bearing balls 15 are supported at one axial end of the rotatable ring 3 on the cylindrical body 2, but on the other axial end thereof on the connecting flange 4, the fixing of the connecting flange 4 to the cylindrical body 2 by way of the screws 14 ensures perfect mounting of the ring 3 between the cylindrical body 2 and the connecting flange 4.

The rearwardly extending part of the cylindrical body is provided with an axially extending slot 24 (FIG. 2) in which an elongate crossbeam 5 is slidably received. The crossbeam 5 extends within and across the cylindrical body 2 substantially perpendicular with respect to the longitudinal axis thereof i.e., the longitudinal axis of the elongate crossbeam 5 is perpendicular to the longitudinal axis of the cylindrical body 2. As shown in FIG. 2, at each of its ends, the outer surface of the crossbeam 5 is provided with a respective thread 5''' which is engaged with an internal thread 3' of the rotatable ring 3. It will therefore be appreciated that rotation of the ring 3 causes movement of the crossbeam 5 in a longitudinal direction of the cylindrical body 2 within the axially extending slot 24. It will also be appreciated that the slot 24 prevents rotation of the crossbeam 5 upon rotation of the ring 3.

The movement of the crossbeam 5 in the longitudinal direction of the cylindrical body 2 causes axial movement of an elongate rod 7 serving as a moving piston, i.e., movement in a direction of the axis of the elongate rod 7 and/or the axis of the cylindrical body 2 in which the elongate rod 7 is housed. This elongate rod 7 extends axially within the cylindrical body 2 and is fixed to the crossbeam 5 for movement therewith by means of a connecting screw 13. The elongate rod 7 is substantially cylindrical and has, at its front end, an oblique portion or extension 8 whose geometric axis is at an angle to the longitudinal axis of the cylindrical body 2. Thus, the linear movement of the rod 7 causes the oblique extension 8 to displace the tool support member 10 substantially radially. The rear end of the rod 7 extends substantially along the longitudinal axis of the cylindrical body 2.

The mounting of the tool support member 10 and its movement by way of the oblique extension 8 may be substantially as described, for example, in European Patent No. 0 593 223. In this respect, the movement of the tool support member 10 is guided by balls 16 (FIG. 4) arranged between external walls of the tool support member 10 and internal walls of the cylindrical body 2. In the illustrated embodiment, the balls 16 are arranged in substantially V-shaped cuts or grooves in the walls of the cylindrical body 2 and the tool support member 10, again substantially as described in European Patent No. 0 593 223. The balls 16 in their respective guideways, defined by the cuts or grooves, enable displacement of the tool support member 10 in a direction substantially perpendicular to the longitudinal axis of the cylindrical body 2 and ensure that the displacement is achieved substantially without backlash and without friction.

In connection with the embodiment disclosed above, or independent thereof (i.e., in another type of boring device for finishing bores), backlash suppression means are provided to prevent backlash between the rotatable ring 3 and the crossbeam 5. In this respect, and as shown in FIG. 1, the crossbeam 5 is provided at each of its ends with one or more elongate slots 25 with which a respective backlash suppression screw 6 is engaged. The backlash suppression means are shown more clearly in FIG. 5 in which it can be seen that each elongate slot 25 is defined between facing slot surfaces 25' and 25". Each slot 25 extends substantially radially in the crossbeam 5 to a closed end 26. As is apparent from FIG. 5, each slot 25 opens into the thread 5''' at each end of the crossbeam 5. As described above, each thread 5''' is engaged with the internal thread 3' of the rotatable ring 3. At least one backlash suppression screw 6, provided with a corresponding lock nut 6', extends in the crossbeam 5 to engage in the respective elongate slot 25. The end of the screw 6 engages the surface 25" of the elongate slot 25 such that the screw 6 tends to urge the facing surfaces 25' and 25" apart. This force urging the facing slot surfaces apart also acts to urge flanks of the thread 5''' against corresponding flanks of the thread 3' whereby backlash between these two engaged threads is suppressed.

As shown in FIGS. 1 and 3, holes 4' are provided in the connecting flange 4 and through the rearwardly extending part of the cylindrical body 2 whereby access to the backlash suppression screws 6 is available. This enables the screws 6 to be adjusted, for example, by means of wrenches, in order that the pressure exerted between the threads 5''' and 3' can be controlled as desired and/or necessary.

It will be appreciated that variations and modifications may be made to the embodiments described and illustrated herein within the scope of the accompanying claims.

I claim:

1. A boring device for finishing high precision bores, comprising a substantially cylindrical body having a longitudinal axis and only a single axially extending slot, a tool supporting member supported by said cylindrical body, said tool supporting member being movable with respect to said cylindrical body and adapted to retain a boring tool, a rotatable ring mounted on said cylindrical body and rotatable about the longitudinal axis of said cylindrical body, said ring having a threaded inner surface, and displacement means for moving said tool supporting member upon rotation of said ring, said displacement means comprising a crossbeam having a threaded outer surface and being arranged in said slot of said cylindrical body such that said threaded outer surface of said crossbeam engages with said threaded inner surface of said ring, and an elongate rod coupled to said crossbeam and said tool supporting member such that rotation of said ring causes movement of said crossbeam within said slot and thus movement of said elongate rod and said tool supporting member.

2. The boring device of claim 1, wherein said elongate rod slidably engages with said tool supporting member.

3. The boring device of claim 1, wherein said crossbeam is elongate and has two spaced ends, threads being formed at said outer surface of said crossbeam at said ends, said threads on said ends of said crossbeam directly engaging with said threaded inner surface of said ring.

4. The boring device of claim 1, wherein said elongate rod is fixed to said crossbeam, said elongate rod comprising a first part extending substantially along the longitudinal axis of said cylindrical body, and a second oblique part extending at an angle to the longitudinal axis of said cylindrical body.

5. The boring device of claim 4, wherein said oblique part of said elongate rod extends within a recess of said tool supporting member, said tool supporting member being mounted on said cylindrical body for movement in a direction substantially perpendicular to the longitudinal axis of said cylindrical body.

6. The boring device of claim 1, further comprising a backlash suppression system arranged in connection with said crossbeam for suppressing backlash between said crossbeam and said ring.

7. The boring device of claim 1, further comprising bearing balls interposed between said ring and said cylindrical body for mounting said ring on said cylindrical body.

8. The boring device of claim 7, further comprising a connecting flange connected to said cylindrical body, said bearing balls being arranged at first and second spaced axial ends of said ring, said bearing balls at said first axial end of said ring engaging directly with said cylindrical body and said bearing balls at said second axial end of said ring engaging directly with said connecting flange.

9. The boring device of claim 1, wherein said rotatable ring is arranged coaxial with respect to the longitudinal axis of said cylindrical body.

10. The boring device of claim 9, wherein said rotatable ring is manually rotatable and externally graduated.

11. The boring device of claim 1, wherein said cylindrical body includes a rearwardly extending part, said slot being formed only in said rearwardly extending part.

12. The boring device of claim 1, wherein said rod is substantially cylindrical.

13. The boring device of claim 1, wherein said cylindrical body is annular and defines a hollow interior, said rod extending axially within said hollow interior of said cylindrical body.

14. The boring device of claim 6, wherein said backlash suppression system comprises at least one backlash suppression screw arranged to suppress play between said threaded outer surface of said crossbeam and said threaded inner surface of said ring.

15. A boring device for finishing high precision bores, comprising a substantially cylindrical body, a tool supporting member supported by said cylindrical body, said tool supporting member being movable with respect to said cylindrical body and adapted to retain a boring tool, a rotatable ring mounted on said cylindrical body and having a threaded inner surface, displacement means for moving said tool supporting member upon rotation of said rotatable ring, said displacement means comprising a crossbeam having a threaded outer surface engaging with said threaded inner surface of said ring, and backlash suppression means arranged in connection with said crossbeam for suppressing backlash between said crossbeam and said rotatable ring.

16. The boring device of claim 15, wherein said backlash suppression means comprises at least one backlash suppression screw arranged to suppress play between said threaded outer surface of said crossbeam and said threaded inner surface of said ring.

17. The boring device of claim 15, wherein said cylindrical body has longitudinal axis, said ring being rotatable about said longitudinal axis of said cylindrical body.

18. The boring device of claim 16, wherein said backlash suppression means further comprises at least one elongate slot defined between respective facing slot surfaces of said crossbeam, said elongate slot opening into said threaded outer surface of said crossbeam engaging with said threaded inner surface of said ring, a respective one of said at least one said backlash suppression screw extending at least partially into said crossbeam to engage one of said facing slot surfaces of one of said at least one elongate slot to urge said facing surfaces apart.

19. The boring device of claim 18, wherein said crossbeam is elongate and has two spaced ends, said threads being formed at said outer surface of said crossbeam at said ends, said threads on said ends of said crossbeam directly engaging with said threaded inner surface of said ring, said at least elongate slot comprises two elongate slots, each at a respective one of said ends of said crossbeam.

20. The boring device of claim 16, further comprising a connecting flange fixed to said cylindrical body, said connecting flange including at least one axially extending bore, said cylindrical body including a corresponding number of aligned, axially extending bores, each forming an aligned bore with one of said at least one bore in said connecting flange enabling access to each of said at least one backlash suppression screw.

21. The boring device of claim 18, wherein each of said at least one backlash suppression screw extends substantially perpendicular with respect to the respective one of said at least one elongate slot.

22. The boring device of claim 18, wherein each of said at least one elongate slot extends substantially radially of said crossbeam.

23. The boring device of claim 15, further comprising bearing balls interposed between said ring and said cylindrical body for mounting said ring on said cylindrical body.

24. The boring device of claim 23, further comprising a connecting flange connected to said cylindrical body, said bearing balls being arranged at first and second spaced axial ends of said ring, said bearing balls at said first axial end of said ring engaging directly with said cylindrical body and said bearing balls at said second axial end of said ring engaging directly with said connecting flange.

25. A boring device for finishing high precision bores, comprising a substantially cylindrical body having an axially extending slot, a tool supporting member supported by said cylindrical body, said tool supporting member being movable with respect to said cylindrical body and adapted to retain a boring tool, a rotatable ring mounted on said cylindrical body and having a threaded inner surface, displacement means for moving said tool supporting member upon rotation of said ring, said displacement means comprising an elongate crossbeam having first and second ends having a threaded outer surface engaging with said threaded inner surface of said ring, each of said ends having an elongate slot defined between respective facing slot surfaces of said crossbeam, each of said elongate slots opening into said threaded outer surface of a respective one of said first and second ends of said crossbeam, and a respective backlash suppression screw extending at least partially into said crossbeam to engage one of said facing slot surfaces of each of said elongate slots to urge said facing surfaces of said elongate slot apart and thereby suppress play between said threaded outer surfaces of said ends of said crossbeam and said threaded inner surface of said ring.

* * * * *